United States Patent
Liu et al.

(10) Patent No.: US 11,920,983 B2
(45) Date of Patent: Mar. 5, 2024

(54) OPTICAL SPECTROMETRY METHOD AND OPTICAL SPECTROMETER

(71) Applicant: Nanyang Technological University, Singapore (SG)

(72) Inventors: Quan Liu, Fujian (CN); Yi Zhang, Espoo (FI)

(73) Assignee: XIAMEN UNIVERSITY, Xiamen (CN)

( * ) Notice: Subject to any disclaimer, the term of this patent is extended or adjusted under 35 U.S.C. 154(b) by 0 days.

(21) Appl. No.: 17/706,352

(22) Filed: Mar. 28, 2022

(65) Prior Publication Data
US 2022/0307904 A1 Sep. 29, 2022

(30) Foreign Application Priority Data
Mar. 26, 2021 (SG) .......................... 10202103149W

(51) Int. Cl.
*G01J 3/28* (2006.01)
*G01J 3/02* (2006.01)

(52) U.S. Cl.
CPC ........... *G01J 3/2846* (2013.01); *G01J 3/0208* (2013.01); *G01J 3/0229* (2013.01); *G01J 2003/285* (2013.01)

(58) Field of Classification Search
CPC ...... G01J 3/2846; G01J 3/0208; G01J 3/0229; G01J 2003/285; G01N 21/01; G01N 21/31
See application file for complete search history.

(56) References Cited

U.S. PATENT DOCUMENTS

| | | | |
|---|---|---|---|
| 7,652,765 B1 * | 1/2010 | Geshwind ............. | G01J 3/2823 356/330 |
| 2005/0254709 A1 * | 11/2005 | Geshwind ............. | G06V 10/56 382/182 |

OTHER PUBLICATIONS

Zhang, Yi, et al. "Compressive optical spectrometry based on sequency-ordered Hadamard transform." IEEE Photonics Journal 12.5 (2020): 1-8. (Year: 2020).*

Wang, Le, and Shengmei Zhao. "Fast reconstructed and high-quality ghost imaging with fast Walsh-Hadamard transform." Photonics Research 4.6 (2016): 240-244. (Year: 2016).*

* cited by examiner

*Primary Examiner* — Tarifur R Chowdhury
*Assistant Examiner* — Carlos Perez-Guzman

(57) ABSTRACT

Embodiments are directed to an optical spectrometry method, comprising: generating a sequence of 2D Hadamard masks along the time dimension, wherein each 2D Hadamard mask is arranged with a wavelength dimension and a coefficient dimension; detecting an optical signal from light transmitted through the sequence of 2D Hadamard masks; and reconstructing a spectrum to be detected by analyzing the optical signal, wherein each 2D Hadamard mask in the sequence of 2D Hadamard masks comprises a plurality of columns along the wavelength dimension, each column corresponding to a different Hadamard coefficient, and having different respective sequency values along the time dimension.

15 Claims, 22 Drawing Sheets

OPTICAL SPECTROMETRY METHOD AND OPTICAL SPECTROMETER

CROSS-REFERENCE TO RELATED APPLICATION

This application claims priority, and from the Singapore patent application 10202103149W filed Mar. 26, 2021, the content of which is incorporated herein in the entirety by reference.

FIELD

The described embodiments relate generally to an optical spectrometry method and an optical spectrometer.

BACKGROUND

Optical spectroscopy is an important technique that can examine the properties of a material by analyzing its interaction with light at a range of wavelengths. As an indispensable tool for material analysis, the current optical spectrometer can be mainly classified into four categories based on their working principles as shown below.

The first category is based on dispersion, where a dispersive grating is used to map light of each wavelength spatially onto a different angle and measured individually by a point detector sequentially or a 1D detector simultaneously. The second category is based on narrow band tunable filters, such as Fabry-Perot spectrometers, acousto-optical tunable filters, liquid crystal tunable filters, etc. This type of spectrometers usually takes narrow-band measurements at one central wavelength each time. The first two categories suffer from low signal-to-noise-ratio (SNR). The third category is based on various interferometers and requires data post-processing such as Fourier transform to retrieve spectra. This category of methods detects light at multiple wavelengths simultaneously by a single pixel detector thus possessing a higher SNR. The fourth category is based on wavelength multiplexing measurements using a spatial light modulator such as digital micromirror device (DMD) or liquid crystal device to enhance the SNR.

In the wavelength multiplexing technique of the fourth category, Hadamard transform spectrometry (HTS) has been proposed to realize wavelength multiplexing by placing Hadamard mask at the exit plane of the conventional grating-based spectrometer and replacing the 2D detector with a single pixel detector, which has been demonstrated successfully from visible to near infrared spectral range.

One common disadvantage of all the past HTS techniques is that they take the sequential direct current (DC) measurements of Hadamard coefficients to our best knowledge, which is subject to the influence of noise and signal drift thus prolonging measurements.

SUMMARY

Embodiments described herein are directed to an optical spectrometry method and an optical spectrometer.

An optical spectrometry method, comprising: generating a sequence of 2D Hadamard masks along a time dimension, wherein each 2D Hadamard mask is arranged with a wavelength dimension and a coefficient dimension; detecting an optical signal from light transmitted through the sequence of 2D Hadamard masks; and reconstructing a spectrum to be detected by analyzing the optical signal, wherein each 2D Hadamard mask in the sequence of 2D Hadamard masks comprises a plurality of columns along the wavelength dimension, each column corresponding to different Hadamard coefficients, and having different respective sequency values along the time dimension.

In some cases, the sequence of 2D Hadamard masks is generated in accordance with a sequency-ordered Hadamard matrix.

In some cases, the different columns along the wavelength dimension of the 2D Hadamard masks follow a principle of complementary alternation in a time domain, to improve a signal-to-noise ratio of the optical signal.

In some cases, the optical signal is detected by a single pixel detector.

In some cases, analyzing the optical signal comprises performing a fast Walsh Hadamard transform on the optical signal to obtain the Hadamard coefficients.

In some cases, reconstructing the spectrum to be detected comprises solving the system of equations:

$$y_i(\lambda) = \sum_{j=1}^{N} s_{ij} x_{ij}(\lambda) = \sum_{j=1}^{N} a_{ij} s_{ij} x_{1j}(\lambda),$$

where $y_i(\lambda)$ are the Hadamard coefficients, $x_{ij}(\lambda)$ is a spectral element of the j-th channel along the wavelength dimension and the i-th channel along the coefficient dimension, $x_{1j}(\lambda)$ is a spectral element of the j-th channel along the wavelength dimension and the first channel along the coefficient dimension, $s_{ij}$ is a coefficient of the spectral element of the j-th channel along the wavelength dimension and the i-th channel along the coefficient dimension, N is the number of the channels along the wavelength dimension, and $\alpha_{ij}$ is a normalization coefficient of spectral intensity.

In some cases, reconstructing the spectrum to be detected comprises a calibration step to obtain values of $x_{1j}(\lambda)$, wherein the calibration step is performed using a pre-calibrated spectrometer as a detector to detect the optical signal.

An optical spectrometer, comprising: one or more processors; a spatial light modulator in communication with at least one of the one or more processors; and a detector for detecting a transmitted optical signal from input light transmitted through the spatial light modulator, wherein the one or more processors are configured to: generating a sequence of 2D Hadamard masks along a time dimension, wherein each 2D Hadamard mask is arranged with a wavelength dimension and a coefficient dimension; detecting an optical signal from light transmitted through the sequence of 2D Hadamard masks; and reconstructing a spectrum to be detected by analyzing the optical signal, wherein each 2D Hadamard mask in the sequence of 2D Hadamard masks comprises a plurality of columns along the wavelength dimension, each column corresponding to different Hadamard coefficients, and having different respective sequency values along the time dimension.

In some cases, the one or more processors are configured to control the spatial light modulator to generate the sequence of 2D Hadamard masks in accordance with columns of a sequency-ordered Hadamard matrix.

In some cases, the different columns along the wavelength dimension of the 2D Hadamard masks follow a principle of complementary alternation in a time domain, to improve a signal-to-noise ratio of the optical signal.

In some cases, the detector is a single pixel detector.

In some cases, the one or more processors are configured to analyze the optical signal by performing a fast Walsh Hadamard transform on the optical signal to obtain the Hadamard coefficients.

In some cases, the one or more processors are configured to reconstruct the spectrum to be detected by solving the system of equations:

$$y_i(\lambda) = \sum_{j=1}^{N} s_{ij} x_{ij}(\lambda) = \sum_{j=1}^{N} a_{ij} s_{ij} x_{1j}(\lambda),$$

where $y_i(\lambda)$ are the Hadamard coefficients, $x_{ij}(\lambda)$ is a spectral element of the j-th channel along the wavelength dimension and the i-th channel along the coefficient dimension, $x_{1j}(\lambda)$ is a spectral element of the j-th channel along the wavelength dimension and the first channel along the coefficient dimension, $s_{ij}$ is a coefficient of the spectral element of the j-th channel along the wavelength dimension and the i-th channel along the coefficient dimension, N is the number of the channels along the wavelength dimension, and $\alpha_{ij}$ is a normalization coefficient of spectral intensity.

In some cases, the one or more processors are configured to reconstruct the spectrum to be detected using a calibration step to obtain values of $x_{1j}(\lambda)$, wherein the calibration step is performed using a pre-calibrated spectrometer as a detector to detect the optical signal.

In some cases, the spatial light modulator comprises one or more digital micromirror devices and/or one or more liquid crystal spatial light modulators.

BRIEF DESCRIPTION OF THE DRAWINGS

Detailed discussions of implementations directed to one of ordinary skill in the art is set forth in the specification, which make reference to the appended figures, in which.

DETAILED DESCRIPTION

Figure 1:
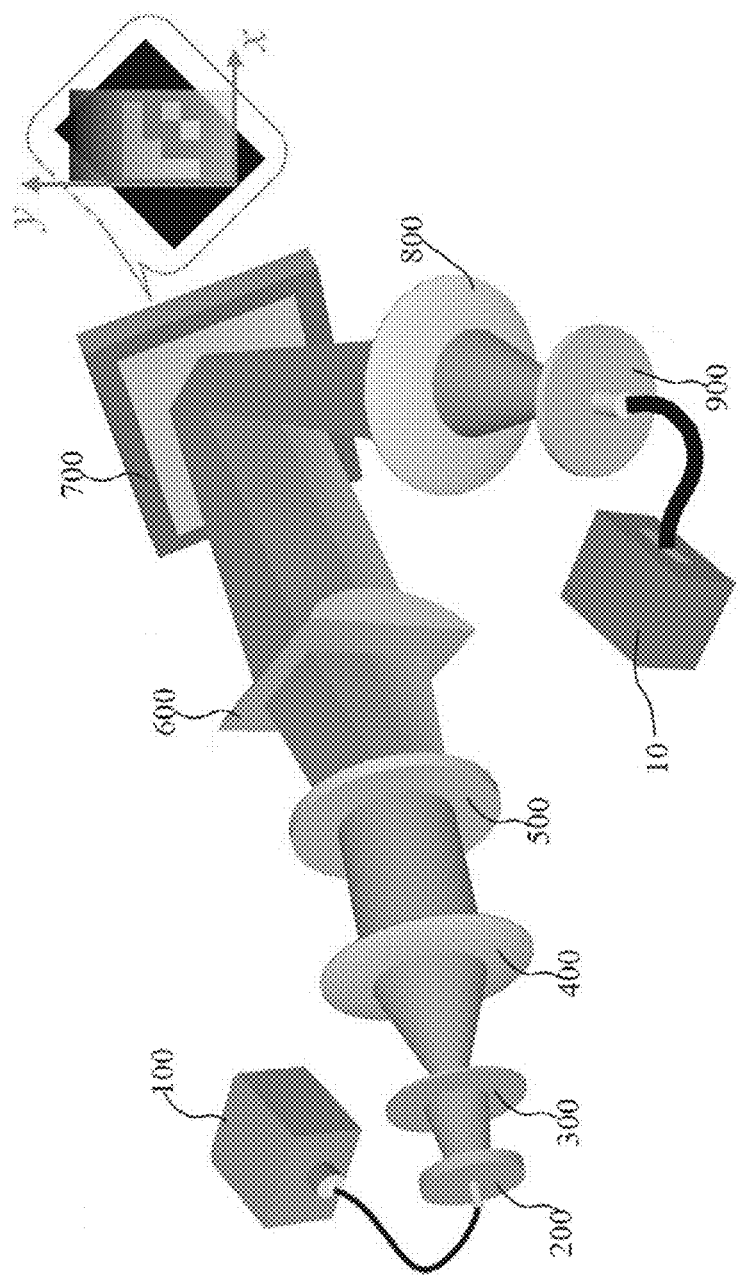
FIG. 1 schematically illustrates the setup of the SEHTS.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

Throughout the specification, when an element is referred to as being "connected to" another element, it may be directly or indirectly connected to the other element and the "indirectly connected to" includes connected to the other element via a wireless communication network.

In addition, the terms used in the specification are merely used to describe particular embodiments of the disclosure, and are not intended to limit the disclosure. In addition, it is to be understood that the terms, such as "comprise", "include", "have", or the like, are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various elements, these elements should not be limited by these terms. The above terms are used only to distinguish one component from another. For example, a first component discussed below could be termed a second component, and similarly, the second component may be termed the first component without departing from the teachings of this disclosure.

Hereinafter, embodiments of the disclosure will be described with reference to the accompanying drawings.

The disclosure provides an optical spectrometry method, i.e. a sequency encoding Hadamard transform spectrometry (SEHTS). In the method, alternating current (AC) measurements of Hadamard coefficients can speed up data acquisition. 2D Hadamard masks are designed to encode each Hadamard coefficient with a different sequency value, and thus enabling all coefficients to be measured at the same time by a single pixel detector. It is demonstrated that the SEHTS encoded by the sequency-ordered Hadamard matrix (SOHM) with 32 spectral channels is able to accelerate spectral measurements from white light sources and fluorescence particles by around 28 times and 140 times, respectively, compared to measurements using a commercial spectrometer when the relative root mean square error (RMSE) is around 3% or smaller. The speed can be boosted by an extra four times when only eight spectral channels are used to achieve a compression ratio (CR) of 4:1, in which the relative RMSEs change only marginally. When the SEHTS is compared to conventional HTS based on sequential DC measurements, the speed can reach three orders of magnitude. This technique is expected to be useful in applications requiring high-speed spectral measurements.

FIG. 1 schematically shows the setup of the SEHTS. The incoming beam from a light source 100 coupled through a 600 µm multimode fiber 200, after passing a 100 µm pinhole 300 and a collimating lens 400 with a focal length of 30 mm, is vertically dispersed by a volume phase holographic grating 500 with respect to the light with different wavelengths. After that, the dispersed light beams at all wavelengths impinge upon a cylindrical lens 600 with a focal length of 100 mm and are focused onto different sets of micromirrors on a digital micromirror device (DMD) 700 with a resolution of 1920×1080 pixels, placed at the focal plane of the cylindrical lens 600. The Hadamard mask for sequency encoding is displayed on the DMD under the control of a computer. The light reflected from the DMD passes a collection lens 800, consisted of lens with a focal length of 75 mm, then is focused into a lightguide 900 with a core diameter of 5.1 mm, and is transmitted to the single pixel detector 10 finally.

It is assumed that a spectrum $X(\lambda)$ may be divided into N spectral elements $x_j(\lambda)$ (j=1,2, . . . ,N), and satisfies $X(\lambda)=\sum_{j=1}^{N} x_j(\lambda)$. A grating-based spectrometer needs N consecutive measurements, each measurement detecting one spectral element $x_j(\lambda)$. Such a measurement suffers from a poor SNR. As an alternative, HTS takes N measurements, where each measurement is the combination of at least half of the spectral elements determined by the Hadamard matrix. The N measurements in HTS can be described by N linearly independent equations as:

$$y_i(\lambda) = \sum_{j=1}^{N} s_{ij} x_{ij}(\lambda) \qquad (1)$$

where $y_i(\lambda)$ (i=1,2, . . . ,N) is called as Hadamard coefficient. It is the sum of N spectral elements each with a weight determined by the i-th Hadamard mask $s_i(s_i=[s_{i1}, s_{i2}, \ldots, s_{iN}])$ corresponding to the i-th row of a Hadamard matrix. $x_j(\lambda)$ is the j-th spectral element. By solving the system of linear equations in Eq. (1), the spectral elements $x_j(\lambda)$ (j=1,2, . . . ,N) can be obtained and then the original spectrum to be detected $X(\lambda)$ can be obtained from the sum of the N spectral elements.

Figure 2A:
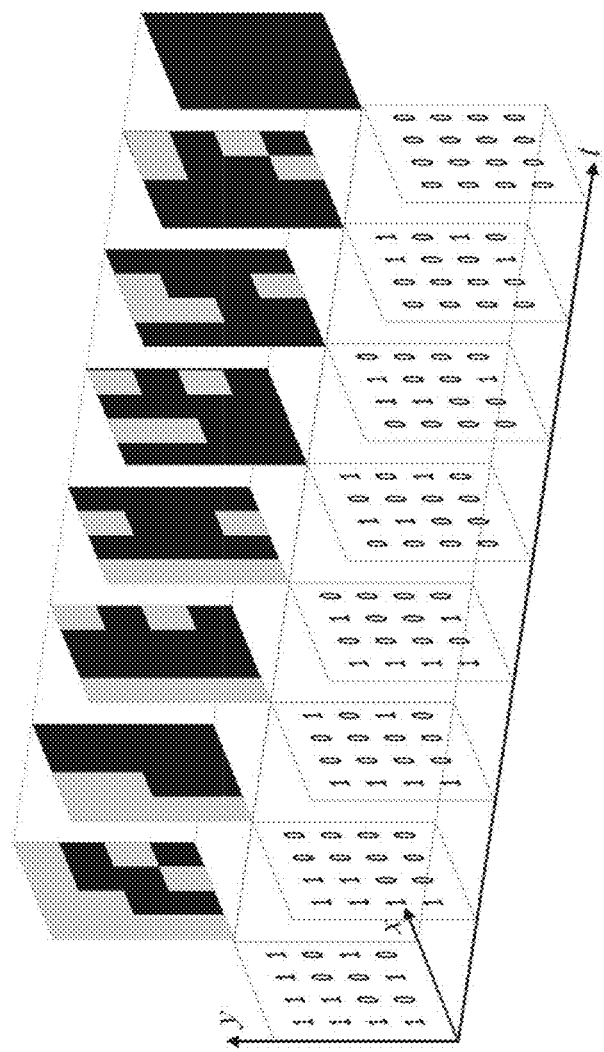
FIGS. 2A-2B schematically illustrate the Hadamard masks and Hadamard coefficients coding scheme of SEHTS.
Figure 2B:
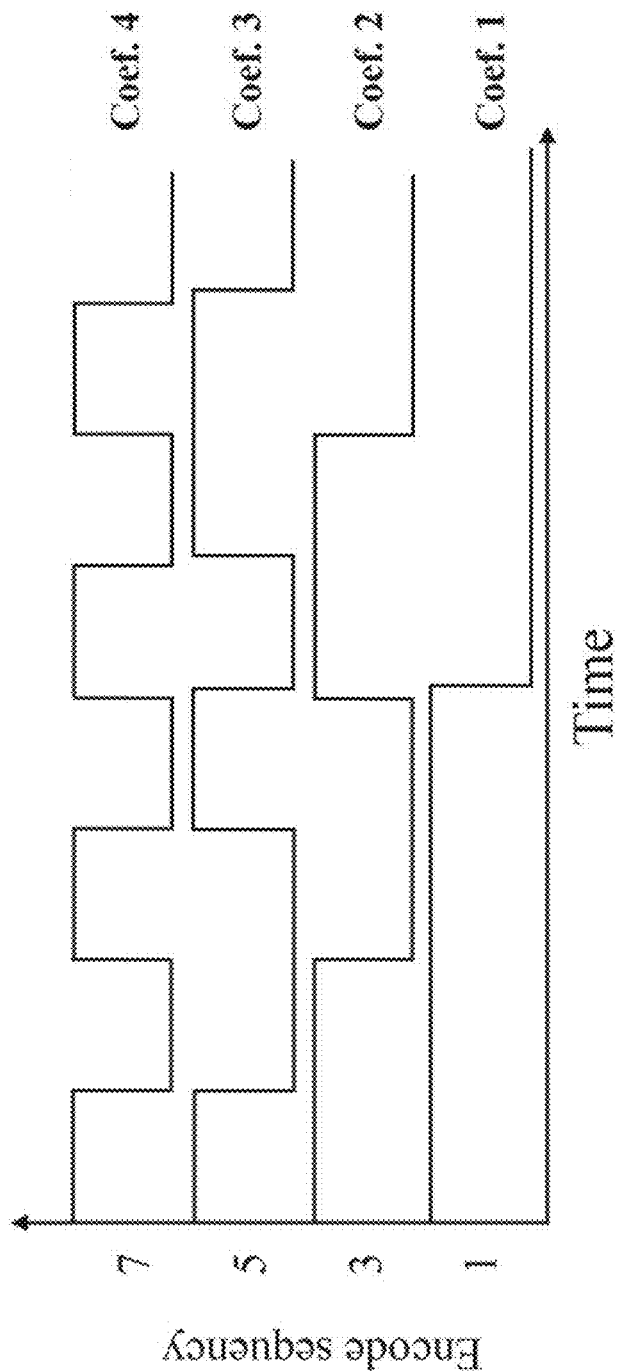

FIGS. 2A-2B schematically illustrate the Hadamard masks and Hadamard coefficients coding scheme of SEHTS by exemplifying the number of channel N=4. FIG. 2A shows sequency encoding 2D Hadamard masks and corresponding SOHM. The 2D Hadamard mask can be divided into N independent columns, each column (along the y-axis) corresponding to $s_i$ in Eq. (1). One Hadamard coefficient $y_i$ upon incident light illumination is modulated by each column. The incident light is dispersed along or parallel to the y-axis, while each Hadamard coefficient is generated by the linear combination of the signals reflected by the micromirrors of the DMD in a column perpendicular to the x-axis. When the number of channels (along the y-axis) increases, the channel width decreases since the total usable number of pixels along the y-axis is fixed, which yields a better spectral resolution. The number of channels in each row (along the x-axis) of the 2D Hadamard mask is identical to the number of the SOHM coefficients in use. As a consequence, the coefficient corresponding to each column of the 2D Hadamard masks can be encoded by a different sequency as shown along the t-axis in FIG. 2A. The sequence of 2D Hadamard masks may be generated along the time dimension (t-axis), and each 2D Hadamard mask may include the wavelength dimension (y-axis) and the coefficient dimension (x-axis). The 2D Hadamard mask may include a plurality of columns along the wavelength dimension, and each column is changed by different sequency values along the time dimension (the change frequency of the Hadamard coefficients).

Each column of the 2D Hadamard masks can be encoded to obtain the different change frequency, as shown along the t-axis in FIG. 2A. FIG. 2B shows the time series for a range of sequency values, including 1, 3, 5 and 7, in one cycle, which works for encoding four Hadamard coefficients. In general, one is able to encode N Hadamard coefficients using all even rows of a 2N×2N SOHM, which have the sequency values of 2i−1 (i=1, 2, . . . , N).

Based on the above description, the output for a 2D Hadamard mask is the signal of the spectral to be detected that modulated, and the output weighted by the respective Hadamard coefficients $y_i$. Each $y_i$ is encoded by a different sequency in the time domain. The resulting output can be expressed as:

$$f(\lambda, t) = \sum_{i=1}^{N} y_i(\lambda) w_{2i}(t) \qquad (2)$$

where t represents time, $w_{2i}(t)$ is the Walsh function designed according to the even row of a 2N×2N SOHM with a sequency value of 2i−1 (i=1, 2, . . . , N) as illustrated in FIG. 2B for the case of N=4.

If the signal of spectrum as described by Eq. (1) is detected by a single pixel detector, the output of the single pixel detector can be modeled by integrating Eq. (1) with respect to wavelength as:

$$\hat{y}_i = \sum_{j=1}^{N} s_{ij} r_j \hat{x}_j \qquad (3)$$

where $\hat{y}_i$ (i=1,2, . . . ,N) is the output of the single pixel detector generated by the i-th Hadamard mask, $r_j \hat{x}_j$ is the contribution to the output of the single pixel detector from the j-th (j=1,2, . . . ,N) spectral element, $r_j$ accounts for the spectral response of the single pixel detector for the j-th spectral element. Similarly, the integration of Eq. (2) with respect to wavelength will yield the output signal of the single pixel detector after encoding:

$$f(t) = \sum_{j=1}^{N} \hat{y}_i w_{2i}(t) \qquad (4)$$

Figure 3A:
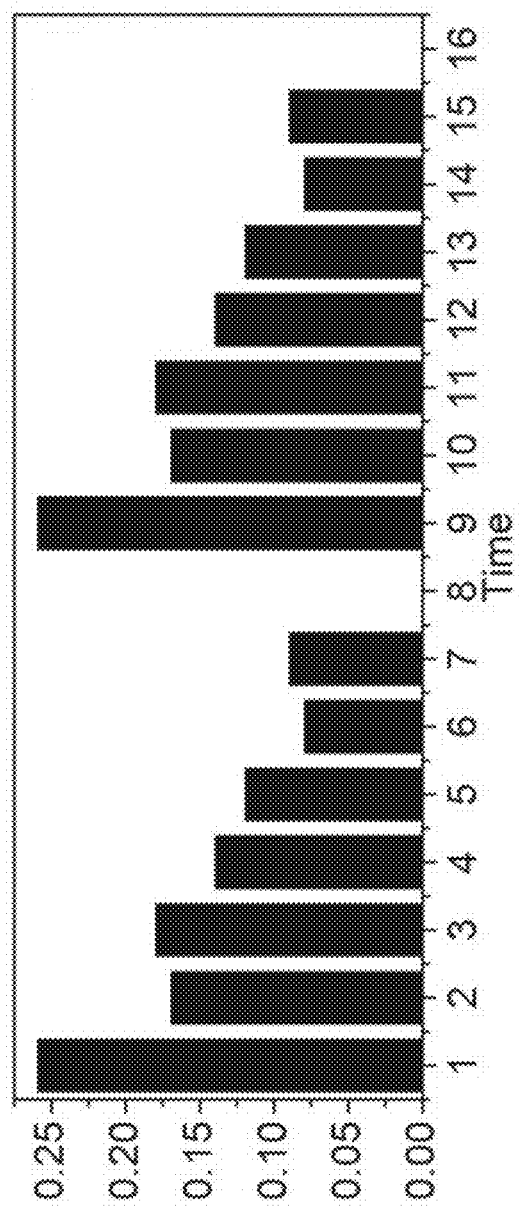
FIGS. 3A-3D illustrate the process for estimating a spectrum with four spectral channels.
Figure 3B:
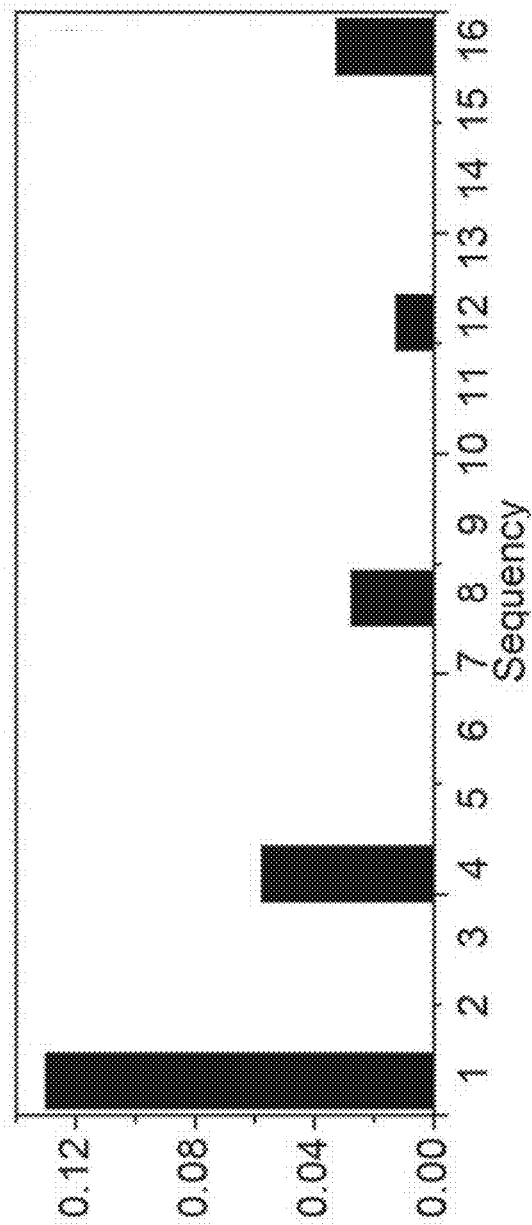
Figure 3C:
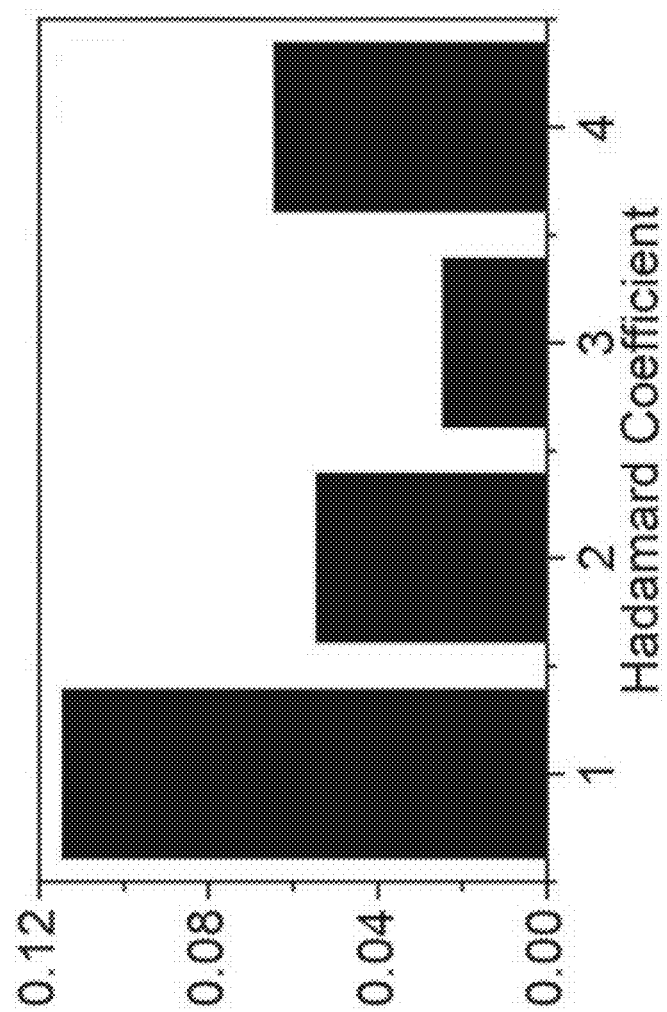
Figure 3D:
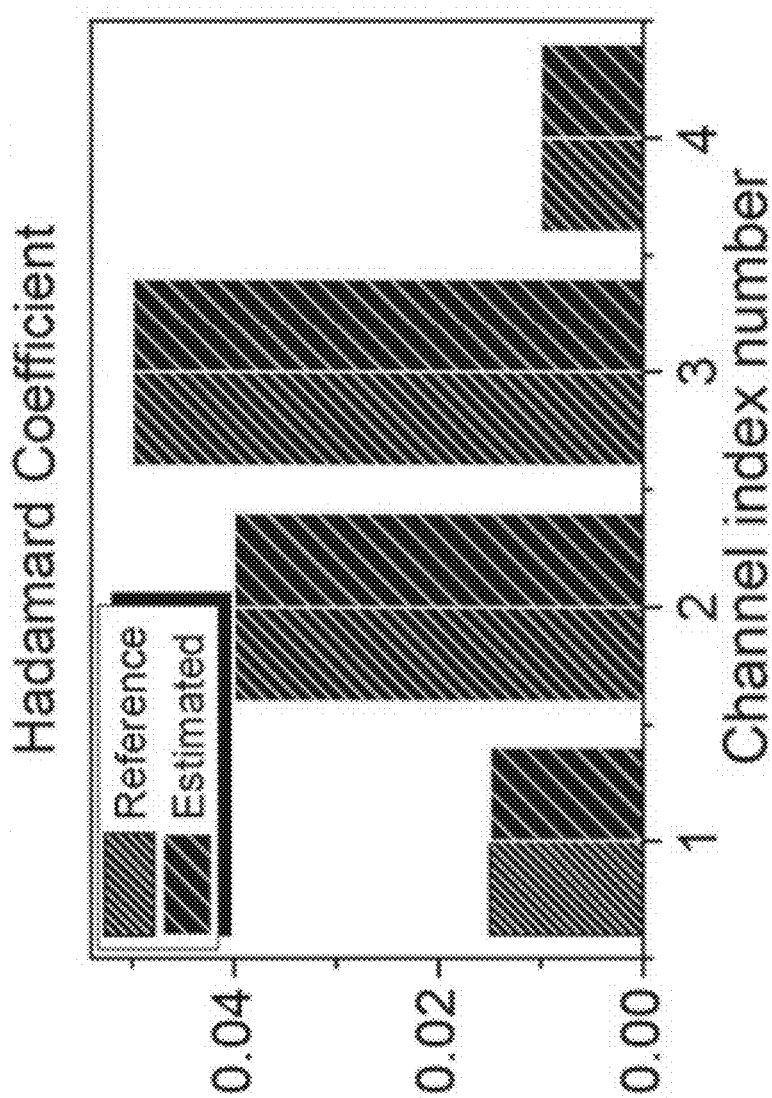

Next, the spectrum can be reconstructed based on $f(t)$. FIGS. 3A-3D shows the reconstruction of the spectrum using four channels. FIG. 3A shows the time domain signal in two periods after sequency encoding. FIG. 3B shows the spectrum signal in sequency-domain obtained after applying FWHT to the time-domain signal in FIG. 3A. FIG. 3C shows Hadamard coefficients. It should be stressed that FWHT requires the length of the time-domain representation of $f(t)$ to be the integer power of two, i.e., $2^n$. One can always pad $f(t)$ series with zeros at the end to fulfill this condition. In the sequency-domain representation of $f(t)$, the location of each $\hat{y}_i$ is determined by the products between periods of $f(t)$ and 2i. FIG. 3D show the spectrum reconstructed by multiplying the Hadamard coefficients in FIG. 3C by the inverse of the SOHM and the expected reference spectrum.

Figure 4A:
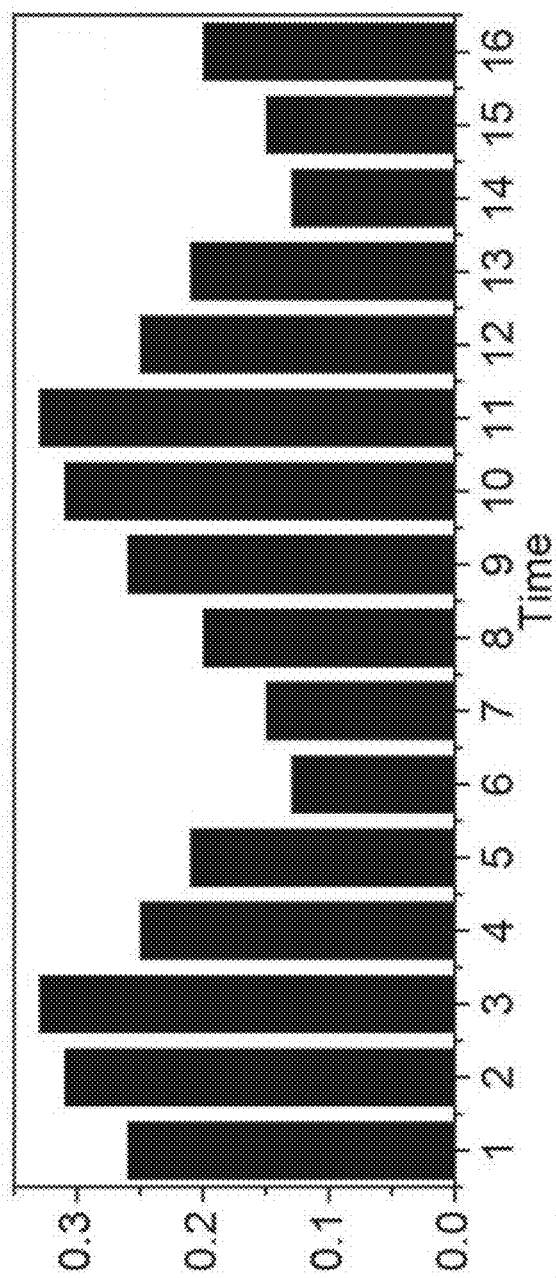
FIGS. 4A-4D illustrate the process for estimating a spectrum with four spectral channels using the complementary scheme.
Figure 4B:
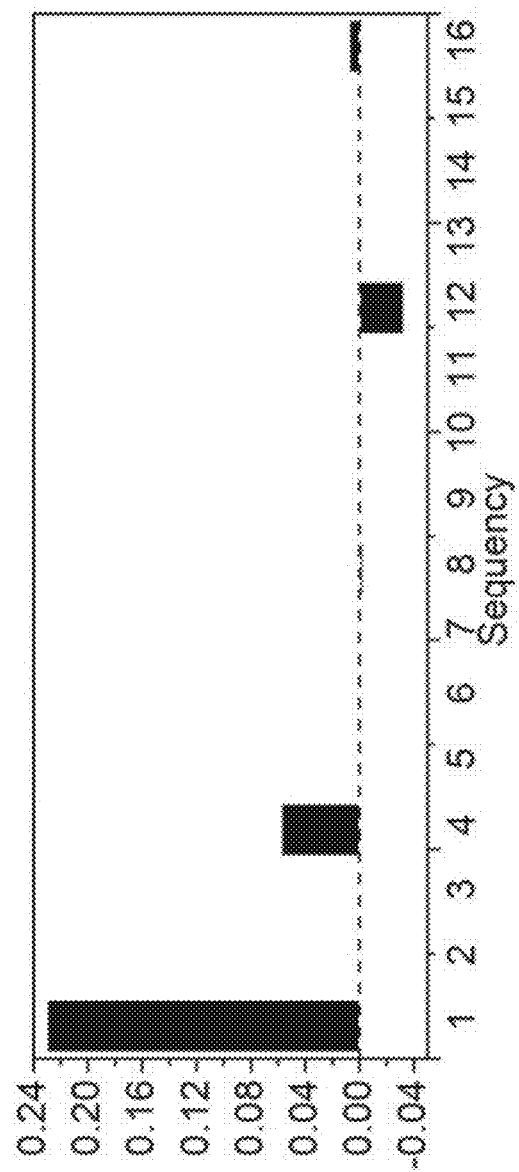
Figure 4C:
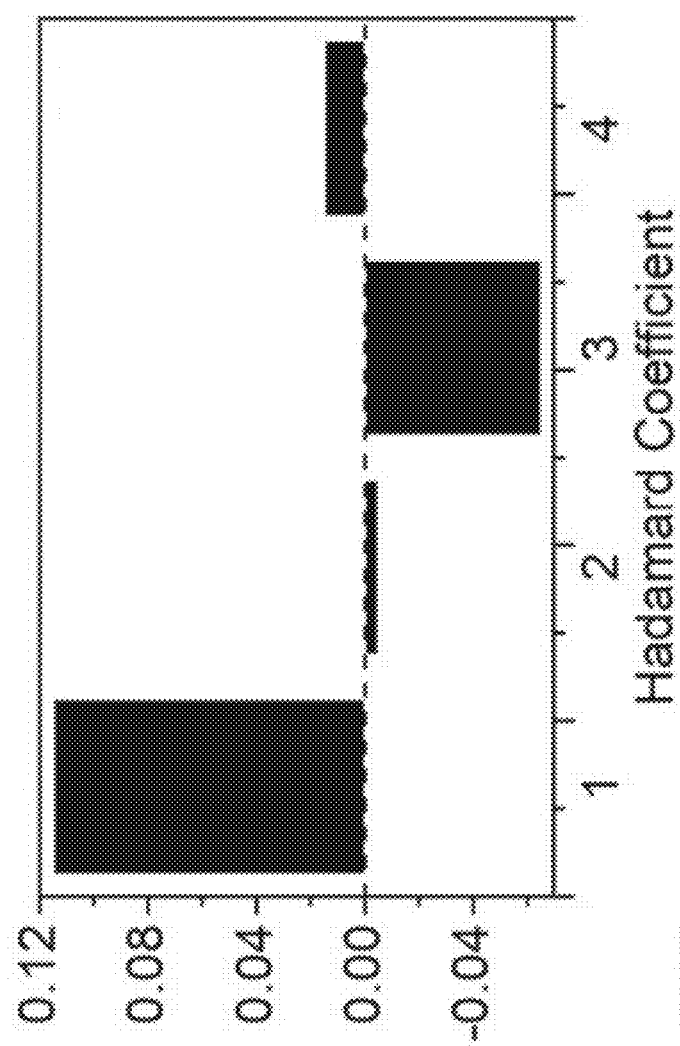
Figure 4D:
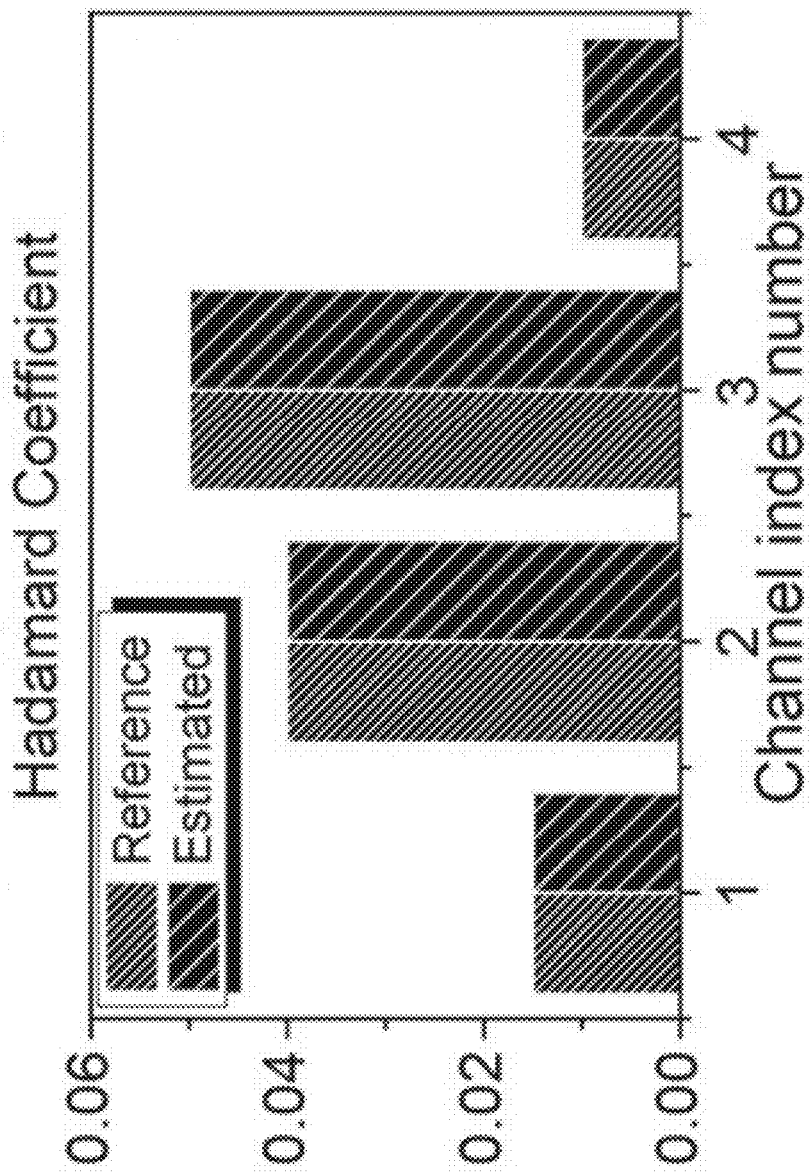

In practice, a complementary pattern may be adopted to minimize the influence of noise. In the SEHTS, the Hadamard coefficients may be changed by the sequence $[s_i s_i^* s_i s_i^* \ldots]$ instead of $[s_i 0 s_i 0 \ldots]$, where $s_i^*$ is obtained by swapping "1" and "0" in $s_i$. Compared to the time-domain signal in FIG. 3A, the signal in FIG. 4A contains no case of zero signal intensity thus the SNR is more consistent using the complementary scheme.

Figure 5A:
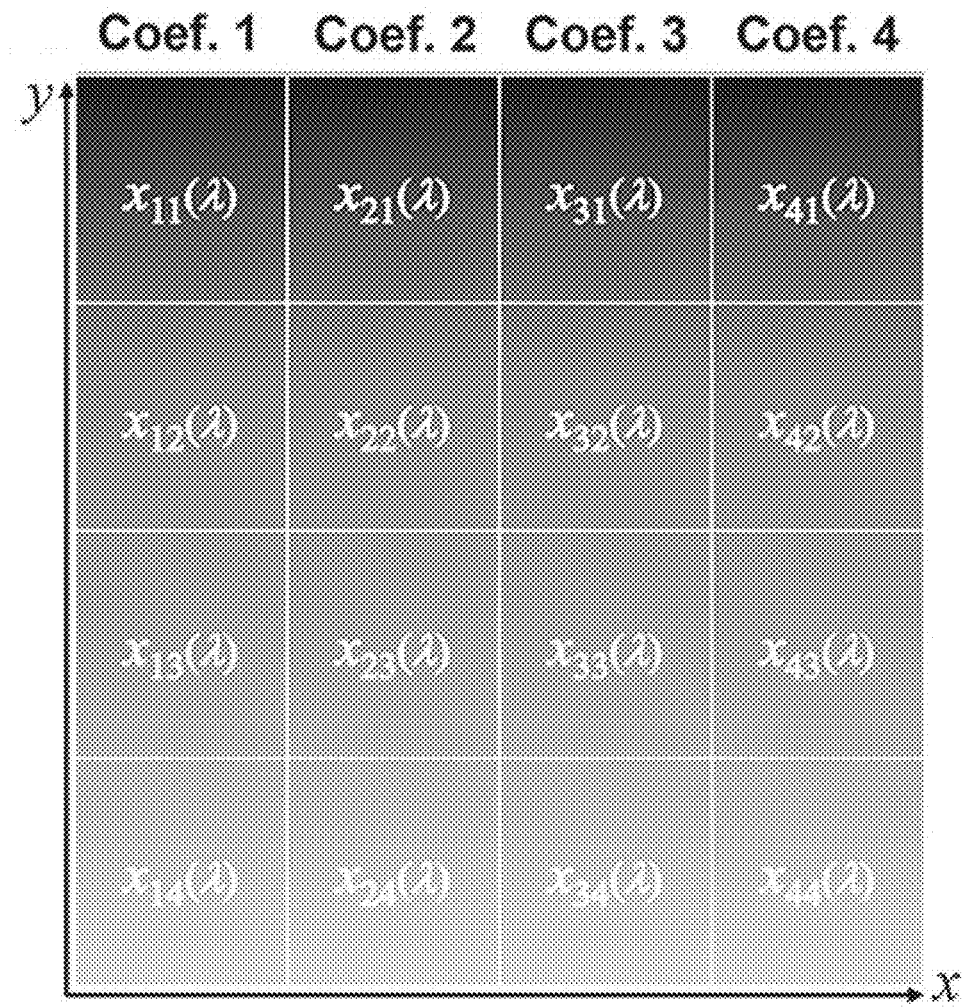
FIGS. 5A-5B illustrate the distribution of spectral elements of the spectral to be detected on a 2D Hadamard masks.
Figure 5B:
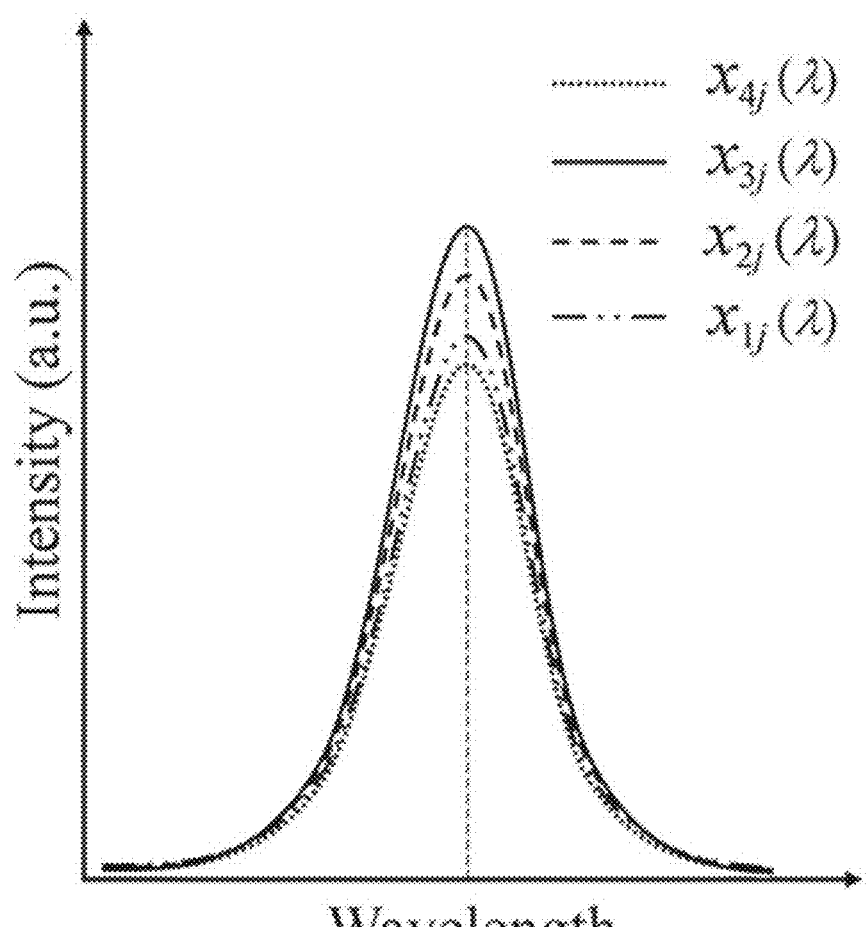

To code all coefficients simultaneously, the beam needs to be spread out along the coefficient dimension as shown in FIG. 5A and each coefficient, i.e., each column, will be encoded separately. FIG. 5A shows the distribution of spectral to be detected when 2D Hadamard masks are divided into four channels, wherein the x-axis is the coefficient dimension and the y-axis is the wavelength dimension. Similar to Eq. (1), the output is:

$$y_i(\lambda) = \sum_{j=1}^{N} s_{ij} x_{ij}(\lambda) \tag{5}$$

The intensity of the spectrum to be detected may not be uniformly identical along the coefficient dimension as illustrated in FIG. 5A. This can be described mathematically as that $X_i(\lambda) = \Sigma_{j=1}^N x_j(\lambda)$ varies with i (i=1, 2, . . . , N). The following will give details about how to estimate $X_1(\lambda)$ for the spectrum to be detected as an example.

As shown in FIG. 5A, for the case of N=4, $x_{ij}(\lambda)$ (i, j=1,2,3,4) represents the spectrum distribution along the coefficient dimension and wavelength dimension, respectively. According to the assumption of the uniform spectral shape but variable intensity along the coefficient dimension, the following coefficient calibration step can be used to calibrate the coefficient of different columns. The spectrum for any one of three columns of grids in FIG. 5A can be expressed as the remaining one column of grids with a normalization coefficient of spectral intensity, e.g., $x_{ij}(\lambda) = \alpha_{ij} x_{1j}(\lambda)$, where $x_{1j}(\lambda)$ is the spectral element of the j-th channel along the wavelength dimension and the i-th channel along the coefficient dimension, $\alpha_{ij}$ the normalization coefficient of spectral intensity and $x_{1j}(\lambda)$ is the spectral element from the j-th spectral channel in the first column. The calibrated equation of Eq. (5) is:

$$y_i(\lambda) = \sum_{j=1}^{N} a_{ij} s_{ij} x_{1j}(\lambda) \tag{6}$$

For given Hadamard coefficients $y_i$, $x_{1j}(\lambda)$ can be calculated by solving Eq. (6). The corresponding $X_1(\lambda)$ can be obtained by sum of $x_{1j}(\lambda)$.

When the single pixel detector is used to detect the spectrum, its output can be obtained by incorporating the above normalization coefficient of spectral intensity $\alpha_{ij}$ into Eq. (3), i.e., $$\hat{y}_i = \sum_{j=1}^{N} a_{ij} s_{ij} r_j \hat{x}_{1j} \tag{7}$$

where $\hat{y}_i$ (i=1,2, . . . ,N) is the output of the single pixel detector generated by the i-th Hadamard mask, $r_j \hat{x}_{1j}$ is the contribution to the output of the single pixel detector from the j-th (j=1, 2, . . . ,N) spectral channel in the first column, $r_j$ accounts for the spectral response of the single pixel detector for the j-th spectral element. For given Hadamard coefficients $\hat{y}_i$, $r_j \hat{x}_{1j}$ can be calculated by solving Eq. (7).

The calibration procedure includes two steps to obtain spectral elements $x_{1j}(\lambda)$ and the corresponding output $r_j \hat{x}_{1j}$ of the single pixel detector from a broadband light source. In the first step, the configuration of the system is the same as that in FIG. 1 except that the single pixel detector is replaced by a commercial spectrometer (pre-calibrated spectrometer). The spectrometer is used to measure $y_i(\lambda)$ as modeled in Eq. (6). By solving Eq. (6) with known $y_i(\lambda)$, $x_{1j}(\lambda)$ can be obtained. In the second step, as shown in FIG. 1, the single pixel detector can measure the signal modified by the 2D Hadamard masks. $\hat{y}_i$ can be obtained by performing FWHT on the sequency encoded time series $f(t)$ as modeled by Eq. (4). For any given set of $\hat{y}_i$ the corresponding $r_j \hat{x}_{1j}$ can be calculated by solving Eq. (7).

For the measurement of an unknown spectrum $X'(\lambda)$, one just needs to obtain the output of the single pixel detector. Similar to Eq. (4), such a process can be described as:

$$f'(t) = \sum_{j=1}^{N} \hat{y}'_i w_{2i}(t) \tag{8}$$

where $\hat{y}'_i$ (i=1,2, . . . ,N) is the output of the single pixel detector generated by the i-th Hadamard mask when illuminated by the light with a spectrum $X'(\lambda)$. Likewise, $\hat{y}_i'$ can be obtained by performing FWHT on $f'(t)$. Then, the spectral response of the single pixel detector for the first column of the j-th spectral element $r_j \hat{x}_{1j}'$ can be estimated by the following equation:

$$\hat{y}'_i = \sum_{j=1}^{N} a_{ij} s_{ij} r_j \hat{x}'_{1j} \tag{9}$$

where $\alpha_{ij}$ is the normalization coefficient of spectral intensity, $r_j \hat{x}_{1j}'$ is the contribution to the output of the single pixel detector from the first column of the j-th (j=1, 2, . . . , N) channel, $r_j$ accounts for the spectral response of the single pixel detector for the j-th channel, $r_j \hat{x}_{1j}'$ can be obtained by solving Eq. (9) based on the obtained $\hat{y}_i'$ Using the calibration datasets $x_{1j}(\lambda)$ and $r_j \hat{x}_{1j}$ determined in the calibration step, any unknown spectrum, $X_1'(\lambda) = \Sigma_{j=1}^N x_{1j}'(\lambda)$, can be estimated from the outputs of the single pixel detector for the same set of 2D Hadamard masks using the following equation:

$$X_1'(\lambda) = \sum_{j=1}^{N} \frac{r_j \hat{x}'_{1j}}{r_j \hat{x}_{1j}} x_{1j}(\lambda) \tag{10}$$

The Hadamard coefficients $\hat{y}_i$ (and $\hat{y}_i'$) as modeled in Eqs. (7) and (9) can be viewed as the linear combinations of different sequency components in the spectrum weighted by $r_j \hat{x}_{1j}$ (and $r_j \hat{x}_{1j}'$). The Hadamard coefficients corresponding to low-sequency components contain information about the outline of the measured spectrum, and those corresponding to high-sequency components contain information about the fine details of the spectrum. Therefore, only the low-sequency components $\hat{y}_i'$ are needed to retrieve the major information of the spectrum $X_1'(\lambda)$ for the purpose of high-speed measurements when the accuracy requirement is moderate. As a result, we only need to encode the first M Hadamard coefficients of $\hat{y}_i'$, satisfying M<<N, to estimate an arbitrary spectrum $X'(\lambda)$ with a large CR when necessary.

The aforementioned normalization coefficients of spectral intensity $\alpha_{ij}$ are measured as follows. According to the assumption $x_{ij}(\lambda)=\alpha_{ij}x_{1j}(\lambda)$, the spectral intensity $x_{ij}(\lambda)$ of each grid in FIG. 5A needs to be measured first by the single pixel detector in the calibration stage from a broadband light source. Then, $\alpha_{ij}$ can be estimated by taking the ratio of $x_{ij}(\lambda)$ to $x_{1j}(\lambda)$. In this disclosure, all calibration data are obtained using a broadband light source and a commercial spectrometer.

Figure 6A:
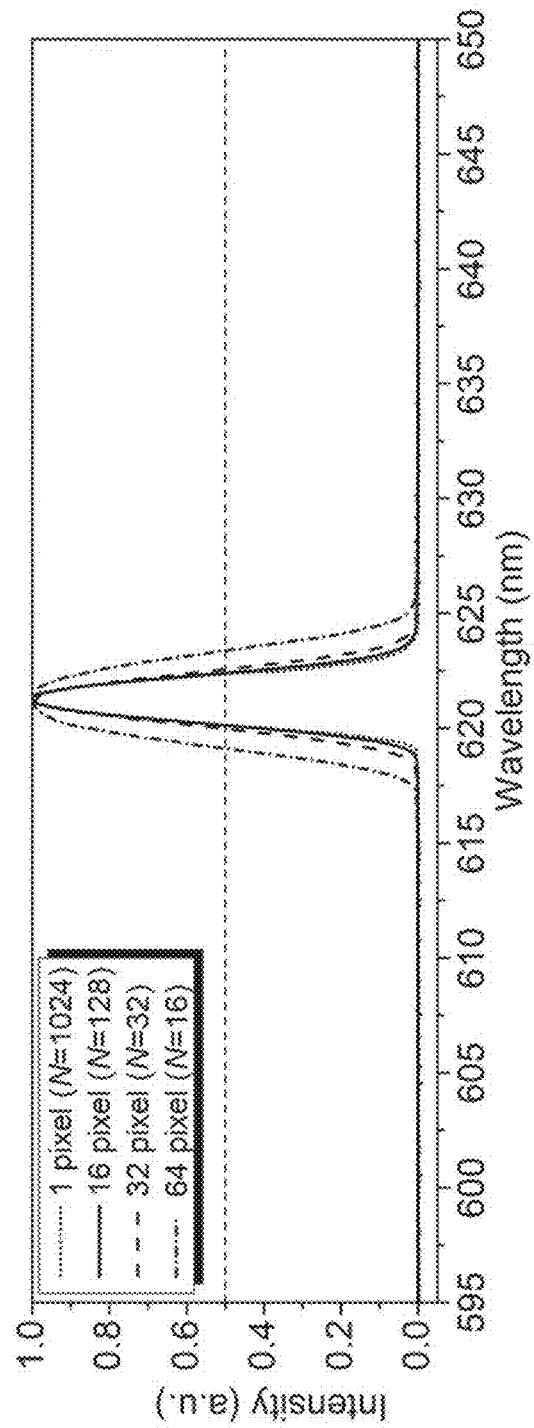
FIGS. 6A-6C illustrate the spectral to be detected that modulated by the Hadamard masks with the different resolutions.
Figure 6B:
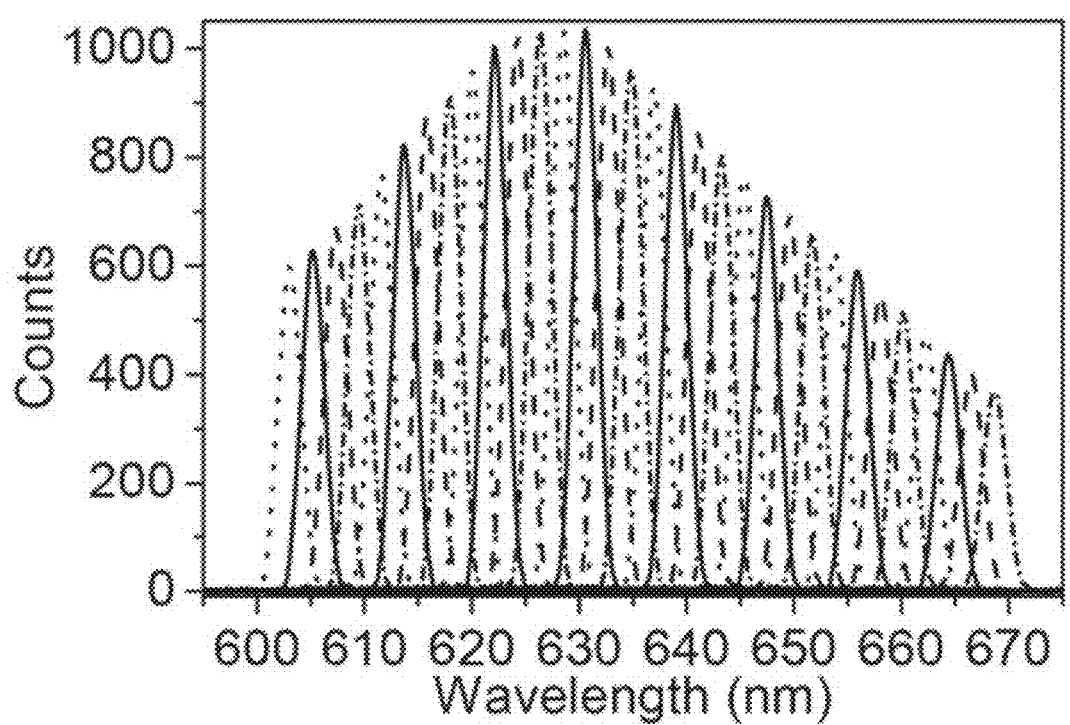
Figure 6C:
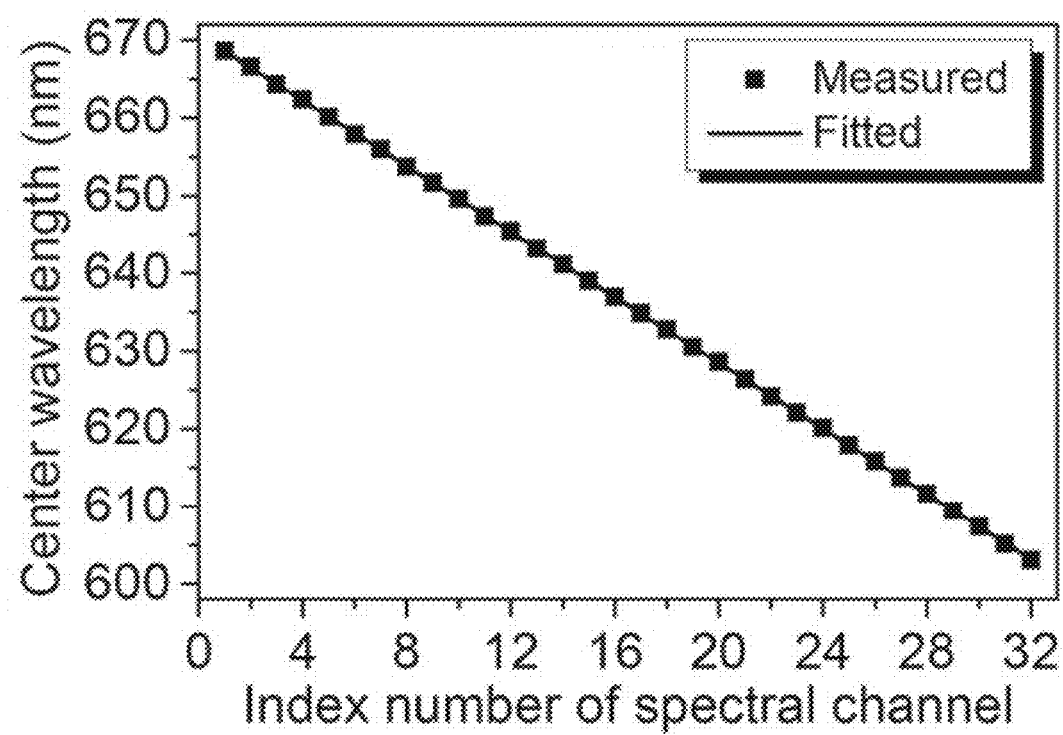

FIG. 6A shows the spectral resolution characterization results of the SEHTS system for a range of channel widths in terms of number of pixels per channel on the DMD. When the channel width is varied from 1 to 16, 32 and 64 pixels per channel, which corresponds to the numbers of channels N=1024, 128, 32 and 16, the spectral resolution changes from 2.3 nm to 2.4 nm, 2.6 nm and 4.1 nm, respectively. As the number of channels increases from N=32 to N=128 and N=1024, the resolution improves by only 0.2 nm and 0.3 nm, respectively. To achieve a tradeoff between spectral resolution and data acquisition speed, the number of channels is set as N=32 subsequently. FIG. 6 shows the spectra of all individual channels, where the light source is an LED. It is noted that the peaks of all spectra have nearly identical full width half maximum (FWHM) as expected. FIG. 6 shows the center wavelength of each channel in the SEHTS system, where the dark blue squares and red curve denote the measured and fitted results, respectively. It can be seen that there exists a linear relation between the center wavelength of a channel and the channel's index number, which agrees with the prediction by a grating's linear dispersion in the first diffraction order.

Figure 7A:
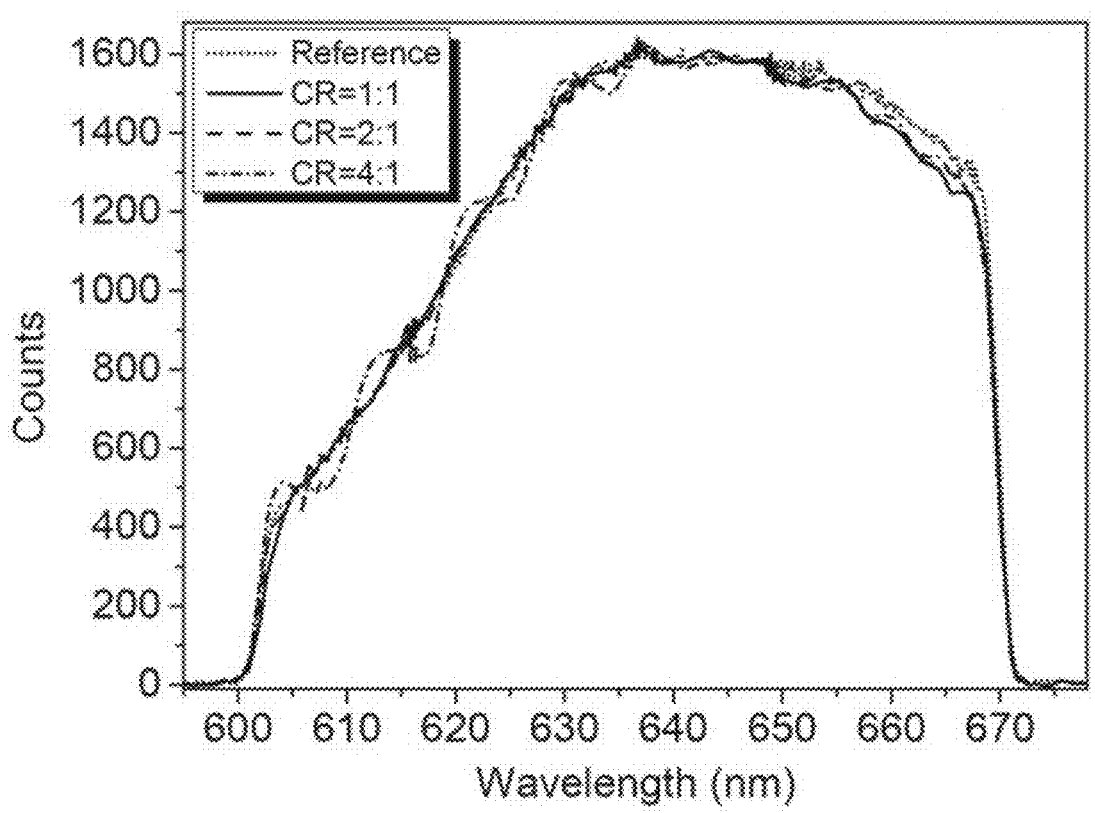
FIGS. 7A-7B illustrate the spectra of a halogen light source measured by the SEHTS.
Figure 7B:
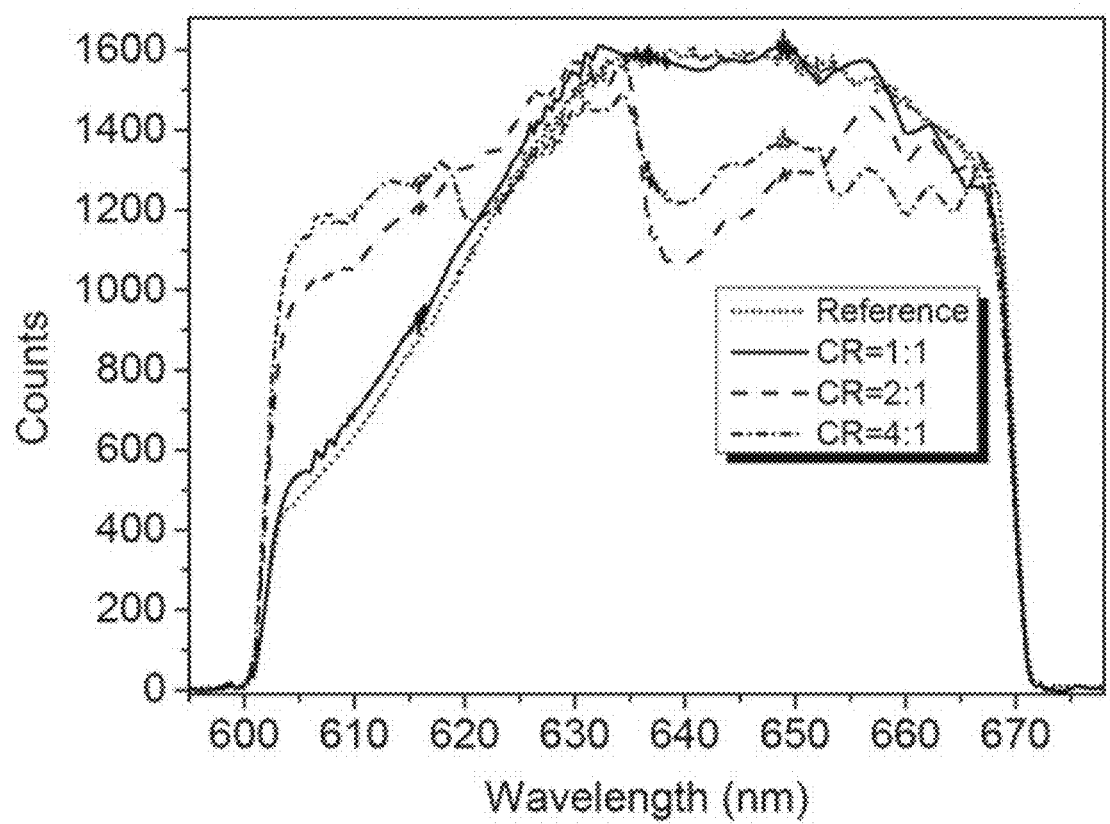

FIGS. 7A-7B show the spectra of a halogen light source measured by the Andor spectrometer (serving as the reference spectrum) and the SEHTS system encoding separately with SOHM and naturally-ordered Hadamard matrix (NOHM) when N=32. In FIG. 7A where the SOHM is used, the agreement between the reference spectrum and the spectrum measured by the SEHTS system (CR=1:1) is excellent. In FIG. 7B where the NOHM is used, the agreement between the reference spectrum measured by the Andor spectrometer and the spectrum measured by the HTS system (CR=1:1) is still quite well.

Figure 8A:
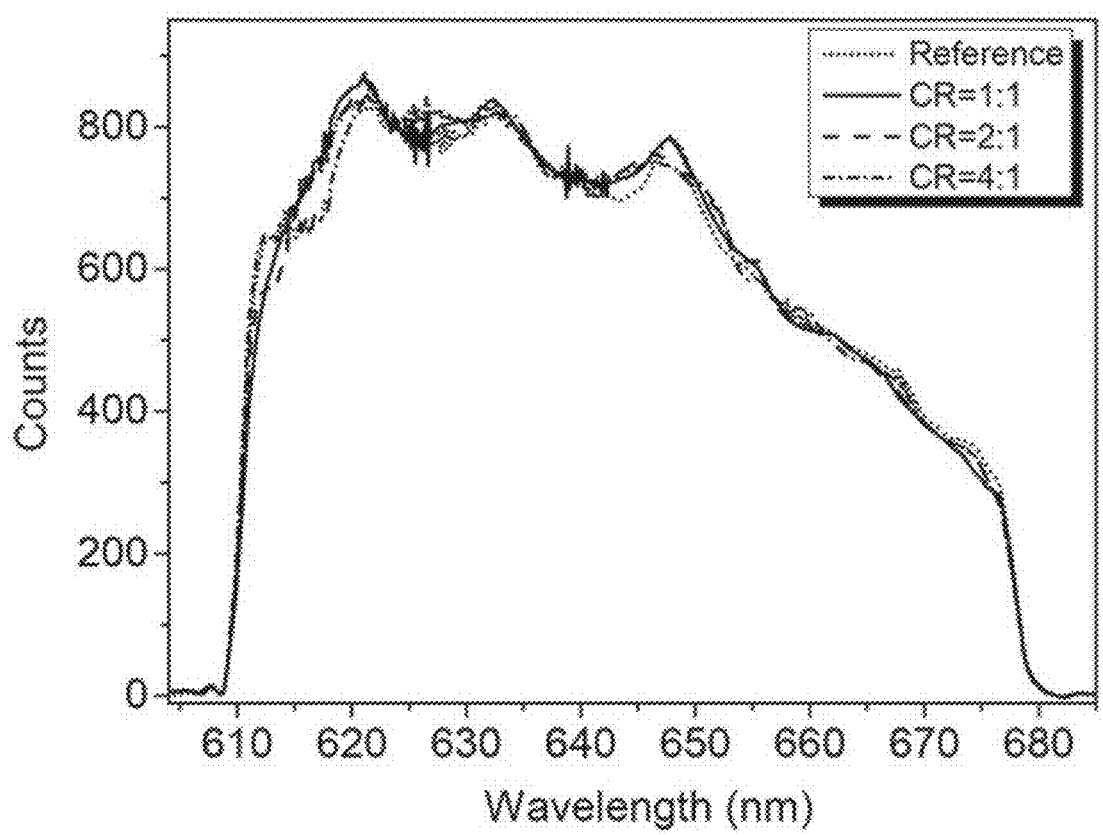
FIGS. 8A-8B illustrate the spectra of a Xenon light source measured by the SEHTS.
Figure 8B:
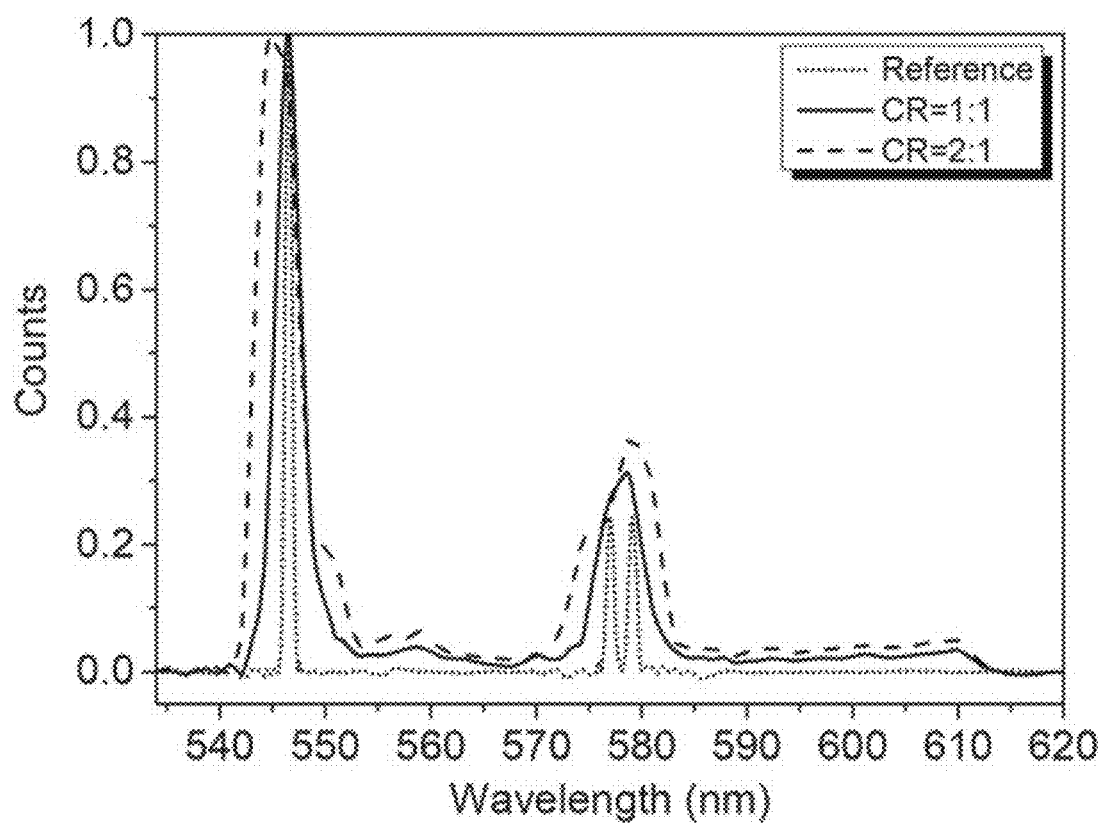

FIG. 8A shows the spectra of a Xenon light source measured by the Andor spectrometer (serving as the reference spectrum) and the SEHTS system when N=32. Note that the spectrum of the Xenon light source contains three peaks each with a FWHM of 4 nm in the tested spectral range, which is different from the previously tested halogen light source. The agreement between the reference spectrum and the spectrum measured by the SEHTS system (CR=1:1) is excellent, in which the relative RMSE is 1.87%. When the CR values are 2:1 and 4:1, the relative RMSE are ~1.92% and 2.03%, respectively. FIG. 8B shows the spectra of a mercury-argon light source measured by the Andor spectrometer (serving as the reference spectrum) and the SEHTS system when N=32. Note that the mercury argon light source contains three peaks each with a FWHM of 0.8 nm, which is beyond the spectral resolution of our current system. Moreover, this source is pulsed with a repetition rate of around 63 kHz, which creates difficulty in estimating the amplitude of the light because of the principle of high-frequency AC measurements in the SEHTS system. To facilitate the comparison in line shape, the spectra given in FIG. 8B have been normalized, which is performed by dividing all data in a spectrum by the greatest value of all. When all Hadamard coefficients are measured, i.e., CR=1:1, the line shape is well recovered although the left peak appears broader than it should be while the two right peaks merge to one due to the inadequate resolution. When the CR value is increased to 2:1, the peaks become noticeably distorted in addition to being broadened further.

Figure 9A:
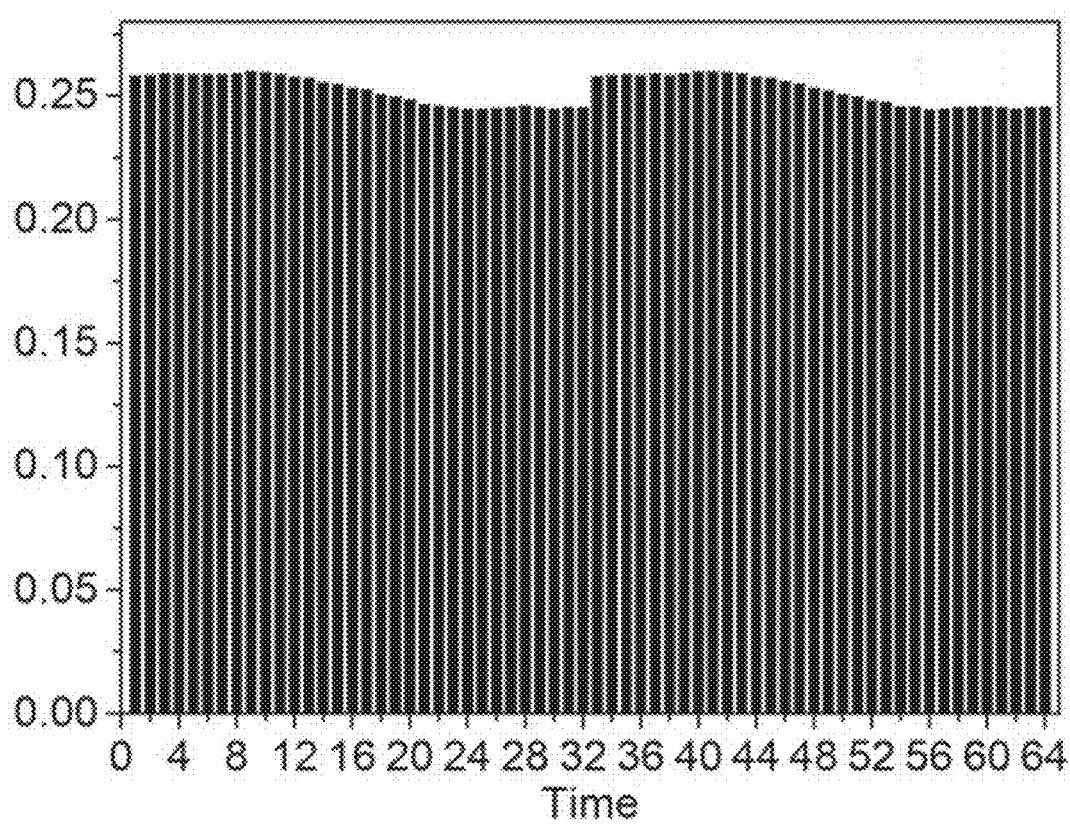
FIGS. 9A-9B illustrate the spectra of a Nile Red particles measured by the SEHTS.
Figure 9B:
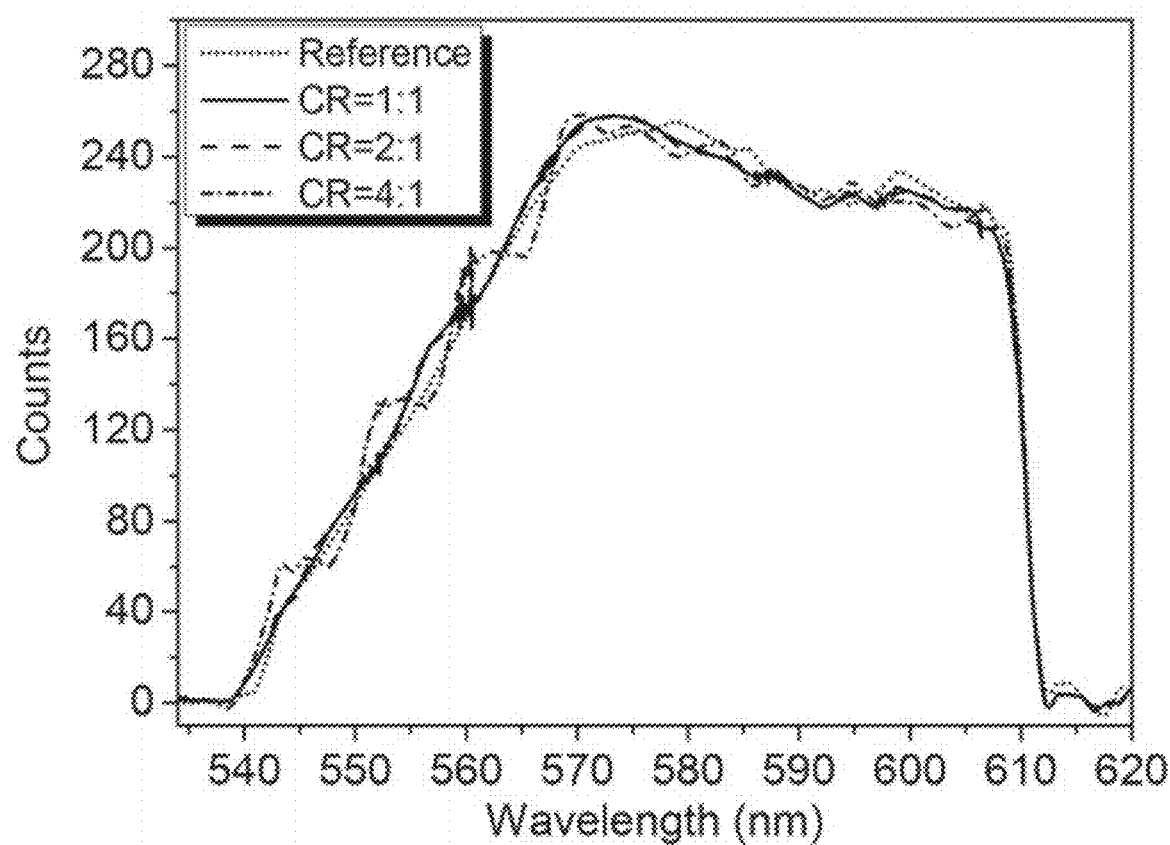

FIG. 9A shows time-domain signal in two periods of Nile Red particles measured by the SEHTS, FIG. 9B shows the fluorescence spectra of Nile Red particles measured by an Andor spectrometer (labeled as "Reference") and the SEHTS system. The acronym "CR" stands for the compression ratio. The calibration data were obtained using an LED light source. The relative RMSE between the reference spectrum and the spectrum measured by the SEHTS system (CR=1:1) is ~3.34%, which proves good agreement. When the CR values are 2:1 and 4:1, the relative RMSEs are ~3.36% and 3.63%, respectively.

In the description of the present disclosure, the description with reference to the terms "an embodiment", "some embodiments", "example", "specific example", or "some examples" and the like means that specific features, structures, materials or characteristics described in connection with the embodiments or examples are included in at least one embodiment or example of the present disclosure. In the present specification, the schematic expressions of the above terms are not necessarily directed to the same embodiments or examples. Furthermore, the specific features, structures, materials, or characteristics described may be combined in a suitable manner in any one or more embodiments or examples. In addition, various embodiments or examples described in the specification, as well as features of various embodiments or examples, may be combined by those skilled in the art without causing any contradiction.

While the embodiments of the disclosure have been shown and described above, it can be understood that the foregoing embodiments are illustrative and are not to be construed as limiting the present application. Variations, amendments, substitutions and modifications may be made by those ordinarily skilled in the art to the foregoing embodiments within the scope of the present application.

What is claimed is:

1. An optical spectrometry method, comprising:
   generating a sequence of 2D masks along a time dimension, wherein each 2D mask is arranged with a wavelength dimension and a coefficient dimension, and each 2D mask in the sequence of 2D masks comprises a plurality of columns or rows, each column corresponding to a different coefficient and having different respective sequency values along the time dimension, or each row corresponding to a different wavelength and having different respective sequency values along the time dimension;
   receiving an optical signal from light modulated by the sequence of 2D masks, wherein the coefficient in each column or the wavelength in each row is encoded in the time dimension with a different sequency value;
   detecting all coefficients or all wavelengths simultaneously; and
   reconstructing a spectrum to be detected by analyzing the optical signal.

2. The optical spectrometry method of claim 1, wherein the sequence of 2D masks is generated in accordance with a Hadamard matrix.

3. The optical spectrometry method of claim 1, wherein the generation of the 2D masks follows a principle of complementary alternation in the time domain, to improve the signal-to-noise ratio of the optical signal.

4. The optical spectrometry method of claim 1, wherein the optical signal is detected by a single pixel detector.

5. The optical spectrometry method of claim 1, wherein analyzing the optical signal comprises performing a fast Walsh Hadamard transform on the optical signal to obtain the coefficients or the light intensity at each wavelength.

6. The optical spectrometry method of claim 5, wherein reconstructing the spectrum to be detected comprises solving the system of equations:

$$y_i(\lambda) = \sum_{j=1}^{N} s_{ij} x_{ij}(\lambda) = \sum_{j=1}^{N} a_{ij} s_{ij} x_{1j}(\lambda),$$

where $y_i(\lambda)$ are Hadamard coefficients, $x_{ij}(\lambda)$ is a spectral element of the j-th channel along the wavelength dimension and the i-th channel along the coefficient dimension, $x_{1j}(\lambda)$ is a spectral element of the j-th channel along the wavelength dimension and the first channel along the coefficient dimension, $s_{ij}$ is a coefficient of the spectral element of the j-th channel along the wavelength dimension and the i-th channel along the coefficient dimension, N is the number of the channels along the wavelength dimension, and $\alpha_{ij}$ is a normalization coefficient of spectral intensity.

7. The optical spectrometry method of claim 6, wherein reconstructing the spectrum to be detected comprises a calibration step to obtain values of $\alpha_{ij}$ and $x_{1j}(\lambda)$, wherein the calibration step is performed using a pre-calibrated spectrometer as a detector to detect the optical signal.

8. An optical spectrometer, comprising:
   one or more processors;
   a spatial light modulator in communication with at least one of the one or more processors; and
   a detector for detecting an optical signal from input light modulated by the spatial light modulator,
   wherein the one or more processors are configured to:
      generating a sequence of 2D masks along a time dimension, wherein each 2D mask is arranged with a wavelength dimension and a coefficient dimension, and each 2D mask in the sequence of 2D masks comprises a plurality of columns or rows, each column corresponding to a different coefficient and having different respective sequency values along the time dimension, or each row corresponding to a different wavelength and having different respective sequency values along the time dimension;
      receiving an optical signal from light modulated by the sequence of 2D masks, wherein the coefficient in each column or the wavelength in each row is encoded in the time dimension with a different sequency value;
      detecting all coefficients or all wavelengths simultaneously; and
      reconstructing a spectrum to be detected by analyzing the optical signal.

9. The optical spectrometer method of claim 8, wherein the one or more processors are configured to control the spatial light modulator to generate the sequence of 2D masks in accordance with a Hadamard matrix.

10. The optical spectrometer of claim 8, wherein the generation of the 2D masks follows a principle of complementary alternation in the time domain, to improve the signal-to-noise ratio of the optical signal.

11. The optical spectrometer of claim 8, wherein the detector is a single pixel detector.

12. The optical spectrometer according to claim 8, wherein the one or more processors are configured to analyze the optical signal by performing a fast Walsh Hadamard transform on the optical signal to obtain the coefficients or the light intensity at each wavelength.

13. The optical spectrometer of claim 12, wherein the one or more processors are configured to reconstruct the spectrum to be detected by solving the system of equations:

$$y_i(\lambda) = \sum_{j=1}^{N} s_{ij} x_{ij}(\lambda) = \sum_{j=1}^{N} a_{ij} s_{ij} x_{1j}(\lambda),$$

where $y_i(\lambda)$ are the coefficients, $x_{ij}(\lambda)$ is a spectral element of the j-th channel along the wavelength dimension and the i-th channel along the coefficient dimension, $x_{1j}(\lambda)$ is a spectral element of the j-th channel along the wavelength dimension and the first channel along the coefficient dimension, $s_{ij}$ is a coefficient of the spectral element of the j-th channel along the wavelength dimension and the i-th channel along the coefficient dimension, N is the number of the channels along the wavelength dimension, and $\alpha_{ij}$ is a normalization coefficient of spectral intensity.

14. The optical spectrometer of claim 13, wherein the one or more processors are configured to reconstruct the spectrum to be detected using a calibration step to obtain values of $\alpha_{ij}$ and $x_{1j}(\lambda)$, wherein the calibration step is performed using a pre-calibrated spectrometer as a detector to detect the optical signal.

15. The optical spectrometer of claim 8, wherein the spatial light modulator comprises one or more digital micromirror devices and/or one or more liquid crystal spatial light modulators.

* * * * *